United States Patent
VanSelous et al.

[11] Patent Number: 5,700,218
[45] Date of Patent: Dec. 23, 1997

[54] TWO-SPEED PLANETARY GEARSET HAVING LOCKING PLANTETARY PINIONS

[75] Inventors: Joseph S. VanSelous, Highland; Judith F. Haggerty, Novi; Kevin E. Norris, Farmington Hills, all of Mich.

[73] Assignee: Ford Global Technologies, Inc., Dearborn, Mich.

[21] Appl. No.: 659,553

[22] Filed: Jun. 6, 1996

[51] Int. Cl.$^6$ ................................. F16H 57/08
[52] U.S. Cl. ................ 475/12; 475/331; 475/324; 475/346
[58] Field of Search .................. 475/331, 346, 475/347, 12, 323, 324; 192/81 C

[56] References Cited

U.S. PATENT DOCUMENTS

| | | |
|---|---|---|
| 2,467,627 | 4/1949 | Olson . |
| 2,959,396 | 11/1960 | Lawrence . |
| 4,730,517 | 3/1988 | Hamano et al. ............... 475/331 X |
| 4,884,471 | 12/1989 | Daggett et al. ............... 475/285 |
| 4,994,007 | 2/1991 | Miura et al. ................... 475/346 |
| 4,998,909 | 3/1991 | Fuehrer .......................... 475/331 |
| 5,250,011 | 10/1993 | Pierce ............................. 475/276 |
| 5,370,590 | 12/1994 | Premiski et al. .............. 475/346 |
| 5,409,430 | 4/1995 | Hashimoto et al. ............ 475/331 |
| 5,435,792 | 7/1995 | Justice et al. ................... 475/276 |
| 5,449,057 | 9/1995 | Frank ............................. 192/46 |
| 5,470,286 | 11/1995 | Fan ................................. 475/331 |

*Primary Examiner*—Khoi Q. Ta
*Assistant Examiner*—Peter T. Kwon
*Attorney, Agent, or Firm*—Frank G. McKenzie

[57] ABSTRACT

The kinematic arrangement of a multiple-speed automatic transmission for an automotive vehicle includes three simple planetary units, hydraulically actuated clutches and brakes applied and released selectively, and several overrunning couplings that produce one-way drive connection between the inner and outer races, which are connected to various components of the gear units. Each of the planetary gear units includes a sun gear, a ring gear surrounding the sun gear, a carrier, and a set of planet pinions in continuous meshing engagement with the sun gear and ring gear and rotatably supported on the carrier. At least one of the gear units includes an overrunning clutch that produces a one-way drive connection between its carrier and one of the planet pinions supported on the carrier.

5 Claims, 3 Drawing Sheets

TWO-SPEED PLANETARY GEARSET HAVING LOCKING PLANTETARY PINIONS

BACKGROUND OF THE INVENTION

1. Technical Field

This invention relates to automatic transmission kinematics, and more particularly to planetary gearing for such transmissions.

2. Description of the Prior Art

Simple planetary gear units comprising a sun gear, a ring gear surrounding the sun gear, a set of planet pinions driveably engaged continually with the sun gear and ring gear, and a planet pinion carrier rotatably supporting the planet pinions, are used to produce multiple ratios of the output speed to the input speed by selectively varying the component of the gear unit that is driven, the component that is driving, the connections among the components of the gear unit, and the component of the gear unit that is held against rotation to provide a torque reaction.

Gear units of this type can be arranged to produce a direct drive connection of the input and output in addition to a speed increase and speed reduction. For example, U.S. Pat. Nos. 2,959,396 and 2,467,627 describe two-speed gearsets that underdrive the output in relation to the speed of the input and produce a direct drive connection of the output and input. These patents employ a locking pinion concept in which power is supplied to the sun gear using a bi-directional motor. In the device of the '627 patent, the pinion carrier provides the reaction and the output is taken at the ring gear; in the device of the '396 patent, the ring gear is held against rotation and the output is taken at the pinion carrier. In both cases, in a first direction of rotation of the input, a direct drive is produced, in the opposite direction of rotation, an underdrive ratio is produced.

U.S. Pat. No. 4,884,471 describes a simple planetary gear unit in which the planetary pinion carrier is the driven member and the output is taken at the ring gear. The gear unit is operated in a direct drive mode wherein the carrier and a set of planet pinions mounted on the carrier are driveably engaged mutually by a one-way coupling. The coupling overruns in other operating modes so that an overdriven output is taken at the ring gear. The '471 patent describes the use of a conventional overrunning coupling that locks the ring gear and sun gear. Conventional one-way clutches provided for accomplishing the drive connection between the sun gear and ring gear are described and illustrated in U.S. Pat. Nos. 2,959,396; 2,467,627; and 5,070,978.

SUMMARY OF THE INVENTION

A planetary gear unit according to the present invention operates by locking planetary pinions to the pinion carrier in order to pass the input speed unchanged through the gearset to its output member, the ring gear. This locking is accomplished using a one-way clutch located at one axial side of one or more planet pinions adjacent a surface of the pinion carrier formed with pockets and adapted to contain struts that driveably engage pockets formed on the adjacent face of the pinion. Each strut is biased by a torsion spring to engage a pocket on the pinion in one directional sense of rotation and to permit the pinion to rotate relative to the carrier in the opposite direction of rotation.

The one-way clutch used in the planetary gear unit of this invention has a substantial torque capacity in comparison to conventional sprag and roller clutches. Furthermore, in a new configuration with a coast clutch connected to a sun gear and the carrier, true input shaft speed can be sensed by a variable reluctance sensor, or a similar device, without need for a very high torque capacity one-way clutch.

In realizing these objects and advantages, the device according to this invention includes a driving member, a driven member, a planetary gear unit supported on a first axis comprising a sun gear continually driveably connected to the driving member, a ring gear surrounding the sun gear, a carrier driveably connected to the driven member, and planet pinions supported for rotation on the carrier, spaced mutually about the axis and continually driveably engaged with the sun gear and ring gear, and overrunning couplings, each coupling providing a one-way drive connection between the carrier and a planet pinion.

BRIEF DESCRIPTION OF THE DRAWINGS

FIG. 4 is a cross section of a portion 4 of the device of FIG. 2 showing a carrier and pinion, and a one-way clutch arranged between them, the clutch in a driving or engaged operating condition.

DESCRIPTION OF THE PREFERRED EMBODIMENT

Figure 1:
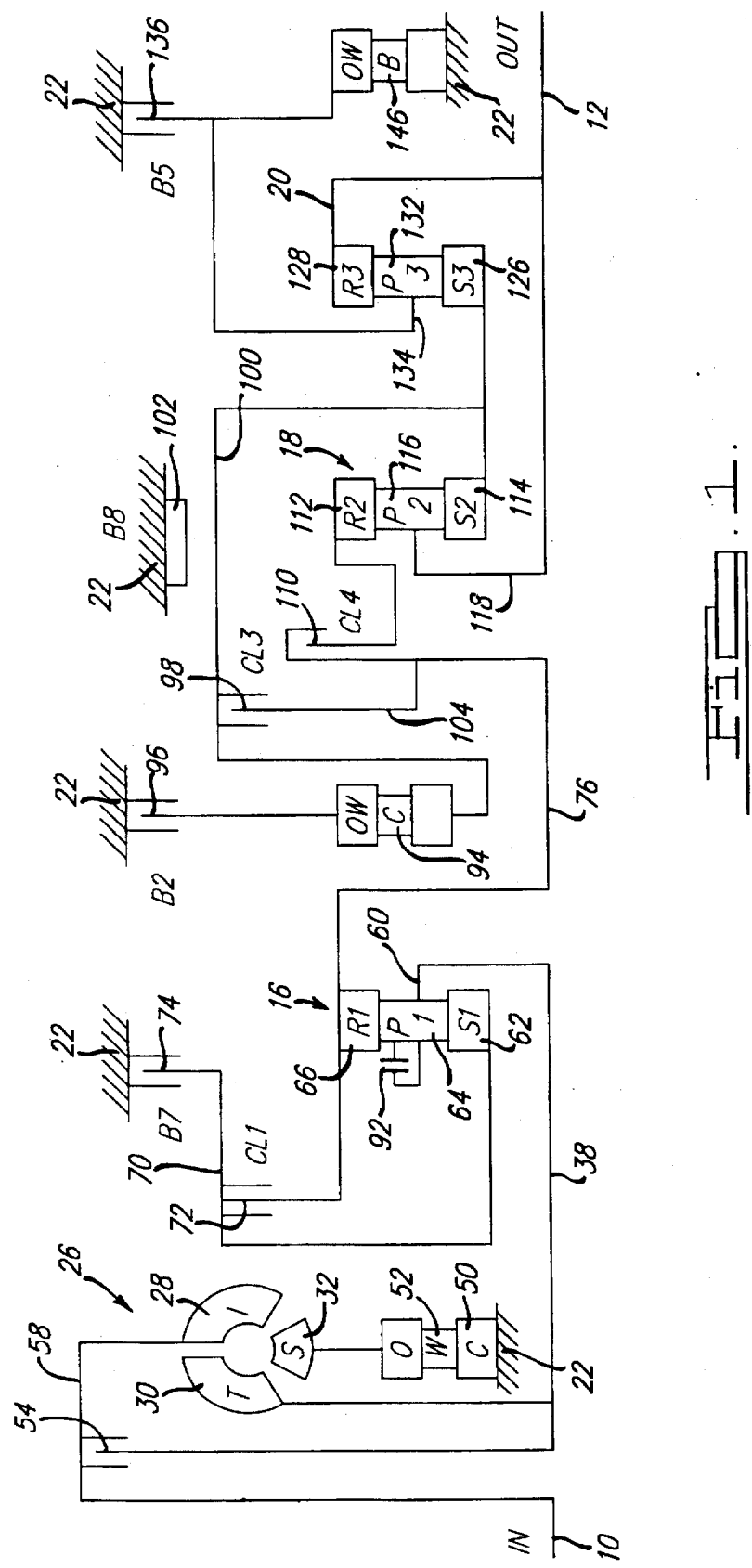
FIG. 1 is a schematic diagram of a multiple-speed transmission kinematic arrangement to which the present invention is applicable.

Referring first to FIG. 1, an engine crankshaft 10 is driveably connected through various shafts, hydraulically actuated friction clutches and brakes, one-way couplings, and multiple planetary gear units to the power output shaft 12, which is adapted to be connected to the vehicle traction wheels through a final speed reduction gear unit, a differential, driveline, and axle assemblies. The main transmission housing encloses simple planetary gear units 16, 18, 20.

An hydrokinetic torque converter 26 includes a bladed impeller 28, a bladed turbine 30, and a bladed stator 32. The impeller, turbine, and stator are arranged in fluid flow relationship in a common toroidal circuit. The impeller includes a housing connected driveably to crankshaft 10. Turbine 30 includes a turbine hub splined to a turbine shaft or driving member 38. Stator sleeve shaft 48 extends from a pump housing and supports the inner race 50 of a one-way clutch 52, whose outer race supports stator wheel 32.

A torque converter lockup clutch 54 is splined to turbine shaft 38 and carries a friction surface, located at its radially outer end, to engage driveably the torque converter cover 58 welded to the impeller housing. Lockup clutch 54 is closed, locked, applied, or engaged to complete a mechanical connection between the impeller and turbine when pressurized hydraulic fluid contained in the torque converter casing forces the friction surfaces of clutch 54 against the housing 58. The torque converter is opened, unlocked, released, or disengaged so that a hydrodynamic driving connection exists between the impeller and turbine when pressurized hydraulic fluid is supplied through a passage located between the converter cover 58 and the friction surfaces of clutch 54 to disengage the surfaces.

Turbine shaft 38 is splined to the carrier 60 of a first planetary gearset 16, which includes a sun gear 62, a set of planetary pinions 64 rotatably supported on carrier 60, and ring gear 66. Sun gear 62 is driveably connected to a member 70 that is common to a coast clutch 72 and an overdrive brake 74. Ring gear 66 is driveably fixed to a drum 68 connected to intermediate shaft or driven member 76.

Overdrive brake 74 includes a set of clutch discs fixed to transmission housing 22, a set of clutch discs driveably connected to the outer surface of clutch member 70 and interposed between the discs fixed to the housing, a clutch piston forced hydraulically against the clutch disc assembly, an hydraulic cylinder containing the clutch piston, and a Belleville spring for returning the piston to the inactive position when hydraulic pressure is removed from the clutch cylinder.

Coast clutch 72, intermediate brake 96, direct clutch 98, forward clutch 110, and reverse brake 136 are constructed in a similar way to that of brake 74.

Figure 2:
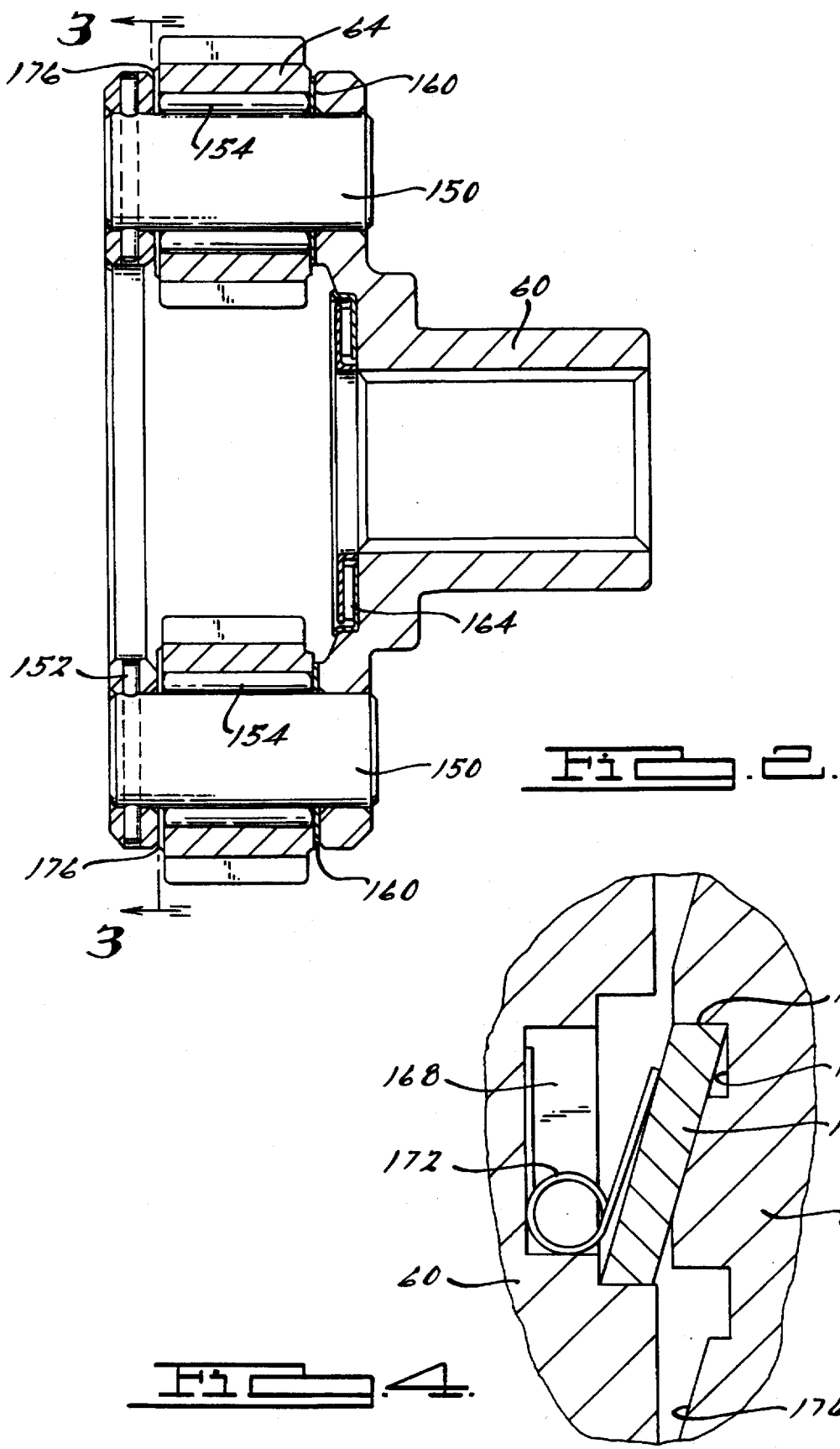
FIG. 2 is a cross section of a pinion carrier for use in a planetary gear unit according to this invention.
Figure 3:
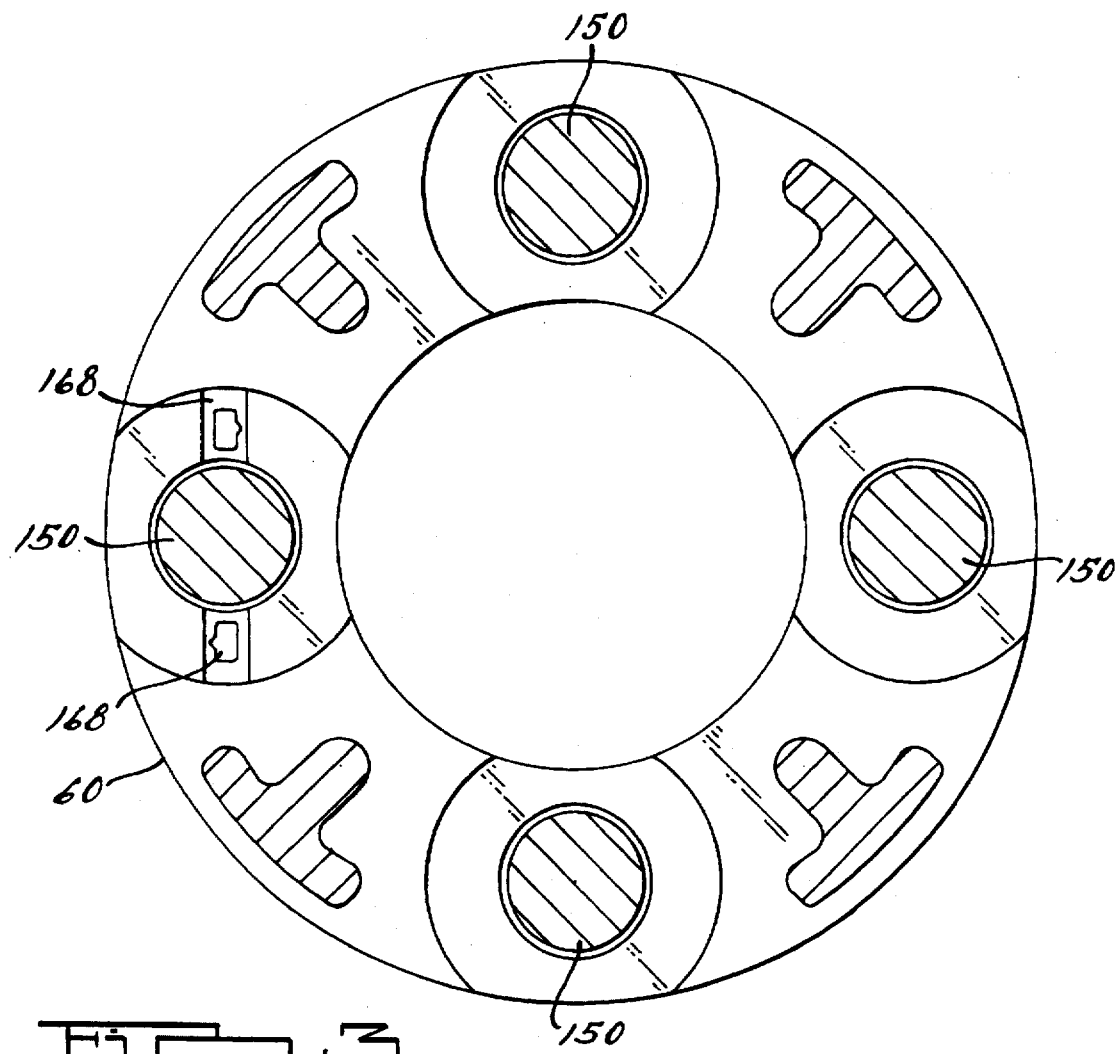
FIG. 3 is a cross section of the pinion carrier taken at plane 3—3.

Multiple one-way clutches 92, shown in greater detail in FIGS. 2 and 3, produce a one-way drive connection between carrier 60 and each of the planet pinions 64, respectively, of the first planetary gear unit 16.

A second one-way clutch 94 is located between intermediate brake 96 and direct clutch 98. Clutch 94 includes an outer race that carries a set of brake discs for intermediate brake 96, an inner race driveably fixed to drum 100, and a driving member located in the annular region between the inner and outer races for producing a one-way drive connection therebetween.

Drum 100 is stopped and held against the transmission casing 22 through the action of an intermediate brake band 102, actuated by an hydraulic intermediate servo. Direct clutch 98 operates to produce a drive connection between drum 100 and clutch member 104. Forward clutch 110 produces a driving connection between clutch member 104 and ring gear 112 of the second planetary gearset 18. This gearset includes a sun gear 114, a set of planet pinions 116 in continual meshing engagement with sun gear 114 and ring gear 112, rotatably supported on a carrier 118, which is driveably connected by a spline to the tail or output shaft 12.

The third planetary gearset 20 includes sun gear 126 formed integrally with sun gear 114, ring gear 128, connected by a spline to the output shaft 12, a set of planet pinions 132 rotatably supported on carrier 134, which is driveably connected to a first set of brake discs of the low/reverse brake 136. When the cylinder of brake 136 is pressurized, the brake holds the the outer race of one-way coupling 146 and carrier 134 against rotation on transmission housing 22 and.

One-way brake 146 includes an outer race pinned to carrier 134, an inner race 150 bolted to the transmission casing 22, and a driving member located in the annular region between the inner and outer races to produce a one-way drive connection between carrier 134 and the casing 22.

The transmission produces six forward gear ratios and two reverse gear ratios. The three lowest of the forward gear ratios are produced both automatically and by manual operation of a gear selector lever manipulated by the vehicle operator. The third forward gear ratio directly connects the engine crankshaft 10 to output shaft 12, and the fourth forward ratio is an overdrive ratio. The first and second forward gears underdrive shaft 12 with respect to the speed of shaft 38. When the gear selector is moved manually by the vehicle operator, the three lowest forward gear ratios and the reverse drive involve engagement of coast clutch 72, and through its operation, an engine braking effect is transmitted through the transmission to output shaft 12.

Low-speed forward acceleration in the automatic range is produced by engaging forward clutch 110. Torque then is delivered from turbine shaft 38 to carrier 60 of the first gearset 16. The set of one-way clutches 92 driveably connect carrier 60 and the set of planet pinions 64 so that intermediate shaft 76 is directly connected to turbine shaft 38. Therefore, the entire gearset 16 turns as a unit and drives intermediate shaft 76 at the speed of input shaft 38. Torque is then delivered from intermediate shaft 76 to ring gear 112 through engaged forward clutch 110, thus imparting driving torque to carrier 118 and output shaft 12. The reaction torque on sun gears 114, 126 is in the reverse direction. This causes a forward drive torque on ring gear 128, which is transferred to the output shaft 112 because carrier 134 acts as a reaction member. Carrier 134 is held against rotation in this instance by one-way brake 146.

During coast operation, i.e., when torque flow is from output shaft 12 to input shaft 38, one-way brake 146 overruns so that there is no torque path to the torque converter.

Gearset 16 produces a similar direct drive between shafts 38 and 76 during operation in the second and third forward gear ratios when the gear selector is in the overdrive range, and during operation in reverse drive with the gear selector in the reverse range.

The fourth forward gear ratio is achieved by engaging forward clutch 110, direct clutch 98, intermediate brake 96 and overdrive brake 74. Sun gear 62 of gearset 16 is held against rotation by brake 74, and one-way clutch 92 freewheels due to the engagement of the overdrive brake. In this instance, ring gear 66 and intermediate shaft 76 are driven at a higher speed than the speed of input shaft 38 and carrier 60. The speed of output shaft 12 is the same as the speed of intermediate shaft 76.

In coast operation, overdrive brake 74 remains engaged and the torque delivery path from output shaft 12 to engine shaft 10 is completed by gearset 16 and torque converter 26. Engine braking is therefore operative.

Referring now to FIG. 2, the carrier 60 of the first planetary gear unit supports a set of planet pinions 64 spaced at equal angular intervals about the central axis of the carrier. Several pinion shafts 150, each located in an axially directed circular hole formed in the carrier, are fixed to the carrier against axial displacement and rotation by staking pins 152, directed transversely to the rotational axis of the carrier. Conventionally, the pinion set includes three, four, or six planet pinions supported on the carrier in this way. Each pinion is supported rotatably on the corresponding pinion shaft 150 by a needle bearing 154. Rotation of the pinions relative to the carrier is facilitated by inserting thrust washers 176, 160 in spaces located at each axially opposite face of the pinion and adjacent the carrier.

Rotation of sun gear 62 relative to the carrier 60 is facilitated by thrust bearings 164.

Figures 5, 6:
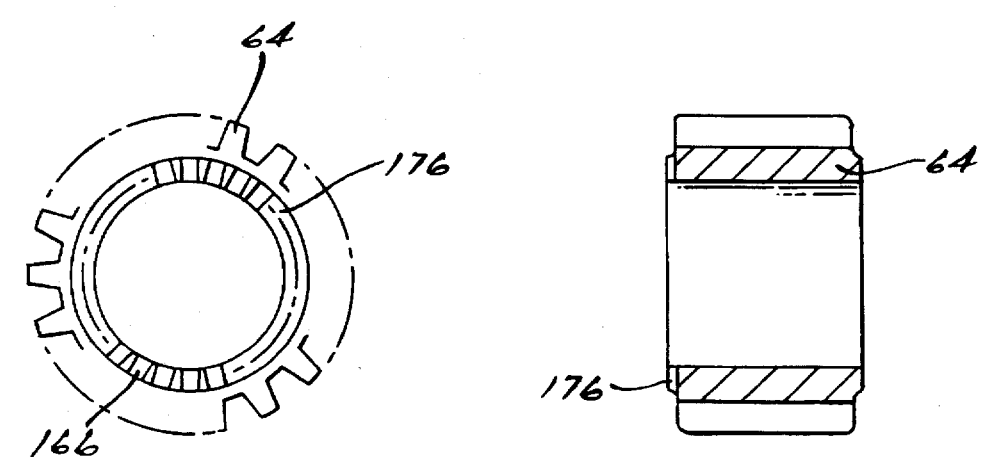
FIG. 5 is a side view of the pinion of FIG. 6.
FIG. 6 is an end view of a pinion showing notches formed on its face.

FIGS. 3–5 show angularly spaced notches 166, formed on an axial face 176 of planetary pinion 64, and pockets 168, formed on the inner face of the carrier adjacent the surface 176 of the planetary pinions on which the notches 166 are formed. Struts 170 are located between pockets 166 and notches 168. A torsion spring 172, located in a pocket 168, continually urges the strut in that pocket to pivot axially away from carrier 60 and toward notches 166 on the planetary pinion 64. The struts engage in notches 166 formed on the surface 176 of the planetary pinion 64. When the struts are extended into the notches 166, the struts achieve full driving engagement over a small pivoting motion, typically about 15°. The low mass, rectangular construction, and lengthwise pivot give the strut a very low movement of inertia. This low inertia allows a relatively small spring 172 to move the strut into locking position when required. Once lockup action is initiated, the struts and end angles ensure that the transmitted torque forces the strut to rotate to the fully engaged position shown in FIG. 4.

A one-way clutch of this type is available commercially from Brenco Inc., of Petersburg, Va. U.S. Pat. No. 5,070,978 illustrates and describes a one-way clutch suitable for use with this invention. A somewhat similar and suitable one-way clutch is described in U.S. Pat. No. 5,449,057.

Although pockets 168 are shown located at diametrically opposite sides of a shaft 150 and notches 166 are shown formed on only one pinion 64, more than one pinion may carry notches 166 on surface 176 and pockets 168 may be formed at more than one pinion location. Typically, however, only one strut engages between a notch and pocket.

The carrier assembly of this invention produces a locking mechanism that delivers direct drive through the planetary gear unit of which the carrier is a part, yet it allows conventional operation of a planetary gear unit when the one-way clutch is overrunning or disengaged. This arrangement significantly reduces the axial dimension required for a simple planetary gear unit and a conventional one-way clutch that produces a drive connection between two components of the planetary gear unit. It also provides the required locking feature at low cost with easy assembly. The device of the present invention has substantial torque capacity for the appropriate pinion diameter as compared to a conventional sprag or roller clutch, but without loss of pinion bearing capacity.

Although the form of the invention shown and described here constitutes the preferred embodiment of the invention, it is not intended to illustrate all possible forms of the invention. Words used here are words of description rather than of limitation. Various changes in the form of the invention may be made without departing from the spirit and scope of the invention as disclosed.

We claim:

1. In an automatic transmission, a device for controlling a gear unit, comprising:
   a planetary gear unit supported on a first axis comprising a sun gear, a ring gear surrounding the sun gear, a carrier, and planet pinions supported for rotation on the carrier, spaced mutually about the axis and continually driveably engaged with the sun gear and ring gear;
   an overrunning coupling providing a one-way drive connection between the carrier and a planet pinion;
   pinion shafts located at mutually spaced locations on the carrier and fixed to the carrier against displacement and rotation relative thereto, the location of each pinion shaft corresponding to a location of a pinion; a bearing surrounding each pinion shaft, located to support a pinion rotatably on the corresponding pinion shaft;
   the carrier is formed with holes directed transversely to said axis at mutually spaced locations on the carrier corresponding to the locations of the pinions; and each pinion shaft has a hole therethrough directed transverse to said axis and aligned with said holes of the carrier, further comprising;
   a pin located in mutually aligned holes of the carrier and pinion shaft at each mutually spaced location, whereby the pinion shafts are fixed to the carrier.

2. The device of claim 1, wherein the overrunning coupling further comprises:
   a set of pockets defining shoulders in a surface of each pinion directed along said axis;
   a set of notches defining shoulders in a surface of the carrier adjacent the surfaces of the pinions in which the set of pockets is formed; and
   struts having opposing shoulders, carried by a first member of the group consisting of the pinions and carrier, for driveably connecting the carrier and a pinion mutually when the first member of the group rotates in a first direction about said axis, and for allowing said first member of the group to rotate freely about said axis in a second direction opposite the first direction without driveably engaging the other member of the group when said first member of the group is rotated in the second direction.

3. In an automatic transmission, a device for controlling a gear unit, comprising:
   a driving member;
   a driven member;
   a planetary gear unit supported on a first axis comprising a sun gear continually driveably connected to the driving member, a ring gear surrounding the sun gear, a carrier driveably connected to the driven member, and planet pinions supported for rotation on the carrier, spaced mutually about the axis and continually driveably engaged with the sun gear and ring gear; and
   an overrunning coupling providing a one-way drive connection between the carrier and a planet pinion and comprising a set of notches defining shoulders in a surface of each pinion directed along said axis, a set of pockets defining shoulders in a surface of the carrier adjacent the surfaces of the pinions in which the first set of pockets is formed, and struts having opposing shoulders and carried by a first member of the group consisting of the pinions and carrier, for driveably connecting the carrier and pinions mutually when the first member of the group rotates in a first direction about said axis, and for allowing said first member of the group to rotate freely about said axis in a second direction opposite the first direction without driveably engaging the other member of said group when said first member of the group is rotated in the second direction.

4. The device of claim 3, further comprising:
   pinion shafts located at mutually spaced locations on the carrier and fixed to the carrier against displacement and rotation relative thereto, the location of each pinion shaft corresponding to a location of a pinion; and
   a bearing surrounding each pinion shaft, located to support a pinion rotatably on the corresponding pinion shaft.

5. The device of claim 4, wherein:
   the carrier is formed with holes directed transversely to said axis at mutually spaced locations on the carrier corresponding to the locations of the pinions; and each pinion shaft has a hole therethrough directed transverse to said axis and aligned with said holes of the carrier, further comprising
   a pin located in mutually aligned holes of the carrier and pinion shaft at each mutually spaced location, whereby the pinion shafts are fixed to the carrier.

* * * * *